Aug. 9, 1960

C. K. STEDMAN 2,948,153

ANGULAR ACCELEROMETER

Filed April 8, 1957

CECIL K. STEDMAN
INVENTOR.

BY
ATTORNEY

Aug. 9, 1960

C. K. STEDMAN 2,948,153

ANGULAR ACCELEROMETER

Filed April 8, 1957

CECIL K. STEDMAN
INVENTOR.

BY Philip Subkow

ATTORNEY

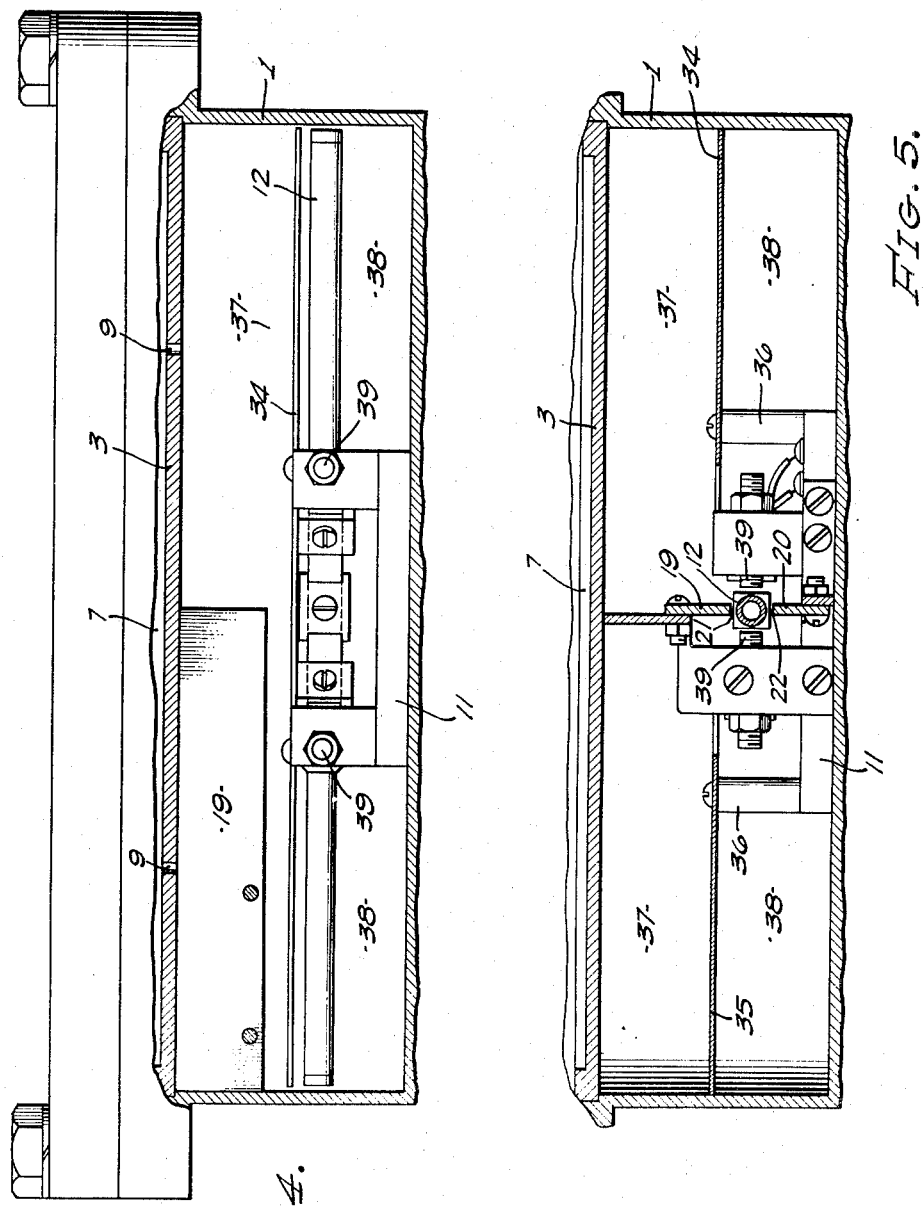

Aug. 9, 1960

C. K. STEDMAN 2,948,153

ANGULAR ACCELEROMETER

Filed April 8, 1957

INVENTOR.
CECIL K. STEDMAN
BY
ATTORNEY

United States Patent Office 2,948,153
Patented Aug. 9, 1960

2,948,153

ANGULAR ACCELEROMETER

Cecil K. Stedman, Enumclaw, Wash., assignor to Statham Laboratories, Inc., Los Angeles, Calif., a corporation of California Filed Apr. 8, 1957, Ser. No. 651,335

8 Claims. (Cl. 73—516)

This invention relates to a motion responsive device for indicating and recording the magnitude and nature of motions of an object in space. It belongs to the general class of motion sensing devices such as accelerometers, in which the effective mass is a liquid. Such devices are described in the Statham Patents Nos. 2,760,038, 2,760,039 and 2,760,040.

In such structures, the motion of the liquid is damped by viscous drag. In order to increase the damping effect, there is added an additional damping means, by causing the fluid to flow through an orifice. The result of this arrangement not only gives an additional damping effect but has the property that it tends to maintain a more nearly constant damping coefficient for the instrument, notwithstanding temperature changes and consequent changes in viscosity of the liquid, than would be obtained if the orifice were not employed.

In the form of my invention, as will be more fully described below, as in the above Statham patents the liquid mass serves as the rotor so that the weight of the paddle which must be supported along the sensitive axis can be made extremely low. Baffles are fixedly mounted above and below the paddle, such baffles being disposed parallel to the axis of the paddle and spaced closely adjacent thereto, thus forming two sub-chambers. The separation between the edges of the paddle and the inner chamber walls form fluid communication passageways, and the spaces between the baffles and paddls form other fluid communicating passages. When the instrument is subjected to an angular acceleration, the inertial forces will cause the liquid to circulate and develop a pressure against the paddle. The paddle will deflect angularly until the elastic restraint of the flexure and the pickoff (mechanism for sensing the motion) balances the forces on the paddle. The novel structure of the invention can be readily adapted to the use of a variety of pickoff mechanisms, to record the angular displacement of the paddle relative to the case.

The damping characteristics of such instruments are such that as the viscosity of the liquid decreases, the damping ratio decreases, passes through a minimum, and then again increases, as the viscosity decreases. This minimum usually extends over a range of viscosity wherein the value of the damping ratio changes but in an unappreciable amount. For convenience, this damping ratio may be termed the minimum damping ratio, and the viscosity, or viscosity at the minimum value of the damping ratio, the minimum viscosity.

For any given instrument design the value of the minimum damping ratio depends on the resistance to flow of the liquid in the orifices and also on resistance to flow in the subchambers, and is approximately equal to the following ratio:

$$\frac{1}{\sqrt{r/R+1}} \quad \text{(Eq. 1)}$$

where $r$ is the resistance to flow through the paddle gaps and $R$ is the resistance to flow in the subchambers.

In any given instrument of the above design, filled with any given liquid, the value of the minimum damping ratio and the temperature at which this minimum occurs will depend, all other things being held constant, on the resistance to flow in the gaps, the damping ratio increasing with decrease in this resistance. It has been observed that all other design parameters being constant, a widening of the gap increases the value of the minimum damping ratio, while on the other hand, a narrowing of the gap results in a reduction in the value of the minimum damping ratio and a reduction in the damping ratio at all temperatures.

One of the problems associated with the above designs is the proper proportioning of the gaps and other design elements which affect the frequency response of the instrument. That is, if the instrument is subjected to a constant acceleration at various frequencies, the relative amplitude of displacement of the paddle, (i.e., the ratio of displacement at the applied frequency to the displacement of the paddle when the constant acceleration is applied at zero frequency) in some cases decreases with rising frequency much more rapidly than in an ideal instrument having constant mass, stiffness and damping. In some cases it first diminishes and then rises to a resonance peak as the frequency increases. This phenomenon is termed "droop" and is an objectionable characteristic for accelerometers and other types of transducers. The desirable characteristic is to obtain a minimum variation in relative response at frequencies to at least 0.4 of the natural frequency.

I have found that the droop may be reduced in value and substantially eliminated by decreasing the distance between the opposed surfaces of the subchambers in which the liquid circulates.

In the preferred embodiment I accomplish this result by introducing into the chambers, baffles whose plane extends transversely to the axis of rotation of the paddles and thus in effect convert the subchambers into a plurality of parallel elongated flow channels through which the liquid moves in parallel flow between surfaces which are more narrowly spaced than the top and bottom of the subchamber in which they are placed. As a result of this change, not only is the response curve, which shows droop in the absence of the auxiliary baffles, much improved without any substantial change in natural frequency and damping ratio, but also the range of the instrument is also improved.

By range is meant the angular acceleration required to produce a chosen angular displacement of the paddle. Since in all instruments whose design requirement limits the permissible displacement of the paddle, usually established by the use of stops, my invention increases the utility of the device, permitting the device to be employed over a wider range of accelerations.

I have found surprisingly that in contradistinction to usual seismic systems, in which a solid mass is suspended on a flexible constraint such as a spring, that I may produce a large increase in range with but a minor and even unsubstantial increase in natural frequency and damping ratio.

These and other properties of my invention will be further described in connection with the drawings, of which:

Fig. 4 is a section similar to Fig. 1 of a modification of the structure;

Fig. 5 is a section on line 5—5 of Fig. 4; and

Figure 1:
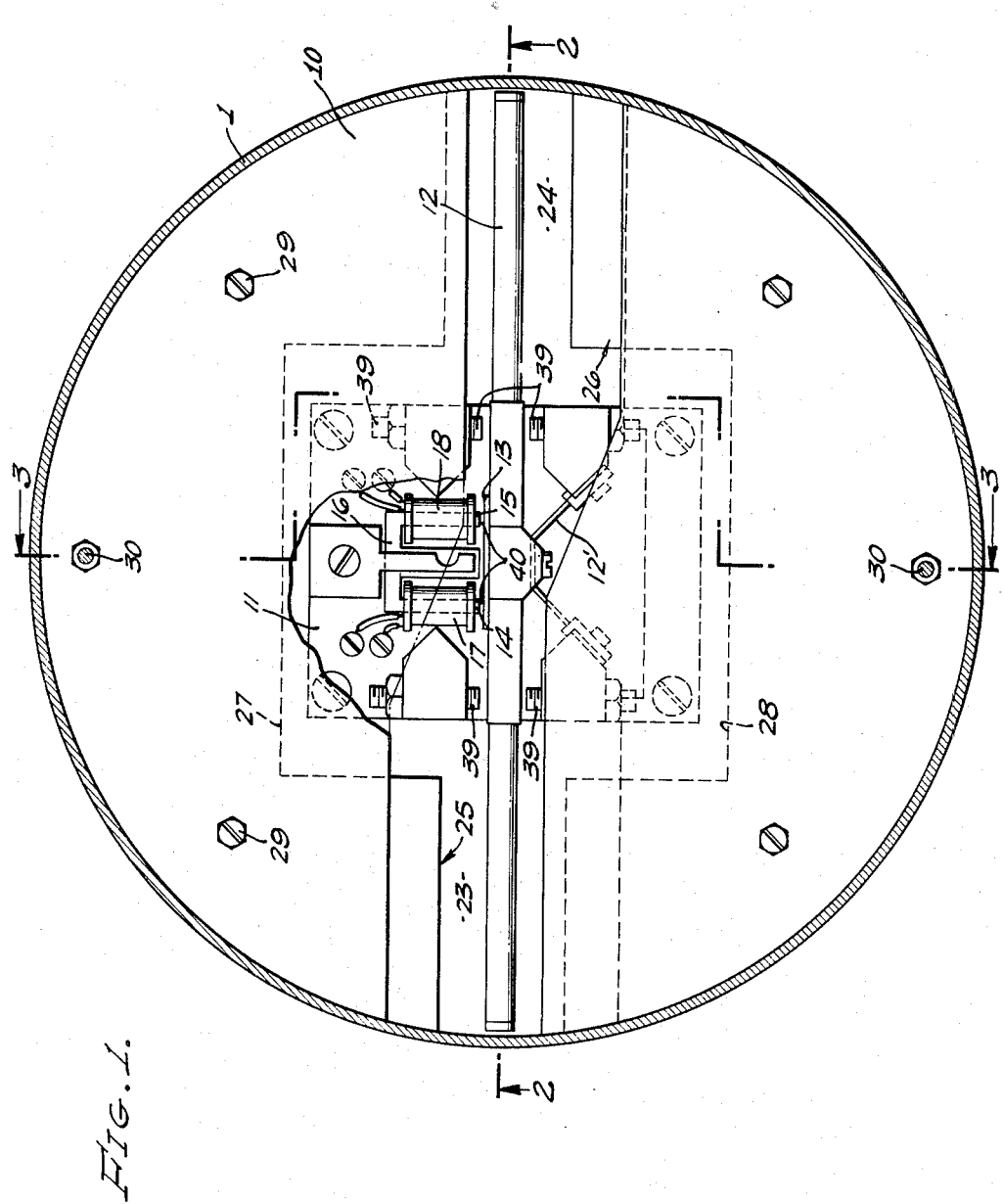
Fig. 1 is an irregular horizontal section of my device taken on line 1—1 of Fig. 2.

The device shown in the drawings, except for the modification to be more fully described below, is substantially identical with the device described in my copending application, Serial No. 577,707, except for the omission of the auxiliary baffle orifices shown in said copending case, which may also be used here for like purposes. It is similar to the device illustrated in Statham patents listed above modified, as will be more fully described below.

The device employs a case 1 in which is carried an expansion chamber 2 sealed by a bottom 3 and a cover 4 and separated by a flexible diaphragm 5 into an air chamber 6 open to ambient pressure and a chamber 7 communicating with the accelerometer chamber 10 via ports 9. The accelerometer chamber 10 (see Fig. 1) formed by the case 1 is shown as circular but may be of any desired cross-section. The case is completely filled with liquid.

Centrally positioned in the chamber 10 is an island 11 on which is mounted a paddle 12 on a Cardan spring suspension 12', which acts as a yieldable constraint and a hinge for said paddle. The paddle is symmetrical about its center and is statically balanced on the spring suspension. The paddle may be made hollow or otherwise reduced in mass, so as to be buoyant to the degree desired or equal in mass to the volume of the liquid displaced by the paddle so as to be of substantially no effective mass. However, if it is desired to introduce linear acceleration sensitivity, the paddle may have a greater mass on one side than on the other side of the axis of rotation.

Mounted on the paddle 12 is a soft iron armature 13 spaced symmetrically from the pole pieces 14 and 15 of the E core 16 of the differential electromagnetic transducer on which the electromagnetic coils 17 and 18 are mounted. In this respect the construction is similar to that shown in the Statham Patent No. 2,778,623.

Across the diameter of the chamber 10 are vertically adjustable baffles 19 and 20, mounted so that the desired spacing 21 and 22 may be provided between the paddle and baffle. The paddle ends are positioned closely adjacent to but are spaced from the wall of the chamber.

This provides two subchambers 23 and 24. In each of these subchambers are placed stacks of plates 25 and 26 notched out at 27 and 28 to encompass the island 11. The plates are separated by nuts 29 on studs 30 and held on the top 3 by means of nuts 31 and are equally spaced from each other. This provides a plurality of parallel passageways 32 and 33 for circulation of liquid relative to the case on angular displacement of the paddle 12, the said baffles and passageways being fixedly positioned in the case in the preferred embodiment illustrated in the drawings so that the passageways and the baffles are perpendicular to the axis of rotation of the paddle on its hinge, the direction of motion of the paddle being in a plane parallel to said passageways and baffles, as is shown in the description in the specification, in this form the direction of circulation of the liquid in the passageways being along plates perpendicular to the axis of angular displacement of the paddle.

Fig. 4 shows the same construction except that only one plate baffle 34 and 35 in each subchamber is mounted on spacers 36 on the island 11 so that each subchamber is divided into two parallel circulatory channels 37 and 38 of equal width. Stop screws 39 are provided to limit the maximum angular displacement of the paddle so that the gap 40 between the armature 13 and the pole pieces 14 and 15 is varied within desirable limits, as will be understood by those skilled in the art.

The case 1 in the forms shown in Figs. 1 to 5 is filled with oil, as in the case of the previously mentioned applications for Letters Patent.

The following example illustrates the results obtained by employing my invention and is not intended to be a limitation of but merely illustrative of the principles of my invention.

Figure 2:
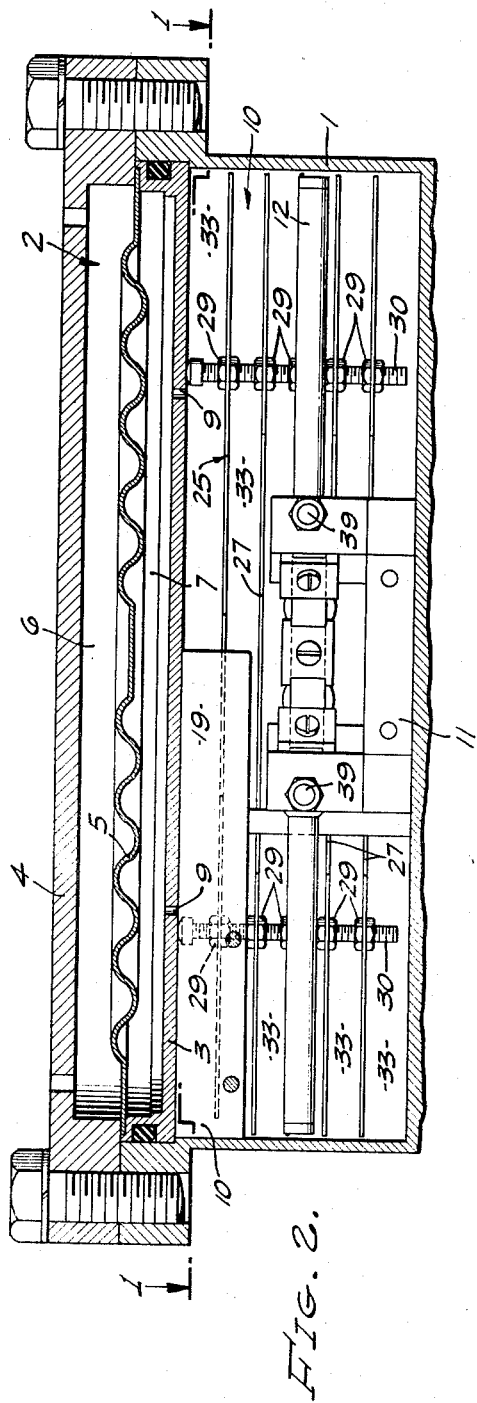
Fig. 2 is an irregular horizontal section taken on line 2—2 of Fig. 1.
Figure 3:
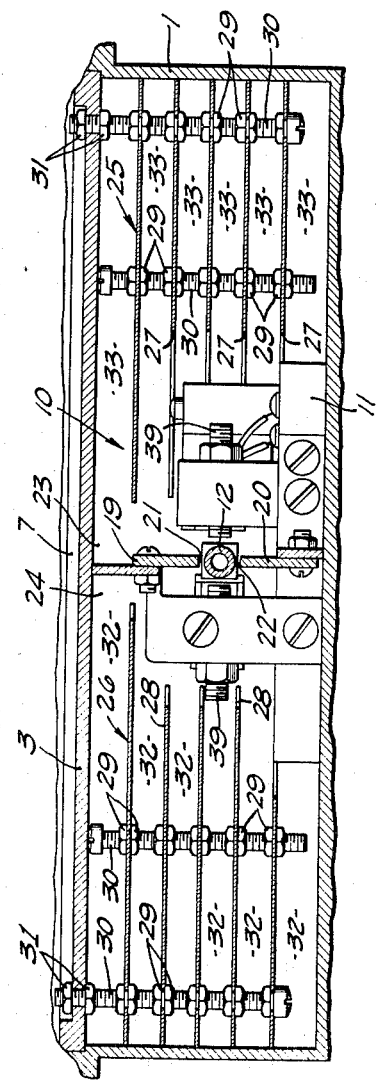
Fig. 3 is a section taken on line 3—3 of Fig. 1.

The device shown in Figs. 1 to 3 was tested to determine its natural frequency, response characteristics, damping ratio (percent of critical damping) and range. This will be referred to as instrument #1. The same device, but with the baffles 32 and 33 removed, was tested under the same conditions and employing the same oil. This will be referred to as instrument #2. The following tables give the data obtained:

Table 1

| Temp. °F. | Natural Frequency Cycles per sec. | | Damping Ratio | |
|---|---|---|---|---|
| | Inst. #1 | Inst. #2 | Inst. #1 | Inst. #2 |
| 75 | 12.6 | 11.3 | .65 | .6 |
| 140 | 14.6 | 14.0 | .3 | .28 |

Table 2

| | Inst. #1 | Inst. #2 |
|---|---|---|
| Sensitivity | 21.0 | 44.61 |

The natural frequency is the frequency at the 90° phase shift point between the paddle and the case.

The sensitivity is reported as the output voltage in millivolts (root mean square voltage) of the bridge used to measure the unbalance of the bridge due to the displacement of the paddle upon application of a given acceleration. The input voltage to the bridge was 12 volts for both instruments. The range is reported as mv (root mean square) volts per volt input to the bridge per radian per sec.$^2$. Since the bridge unbalance is directly proportional to the angular displacement, the ratio of the ranges of the instruments 1 and 2 is equal to the ratio of the reciprocal of the sensitivity. That is, the range of instrument 1 as about twice the range of instrument 2.

Figure 6:
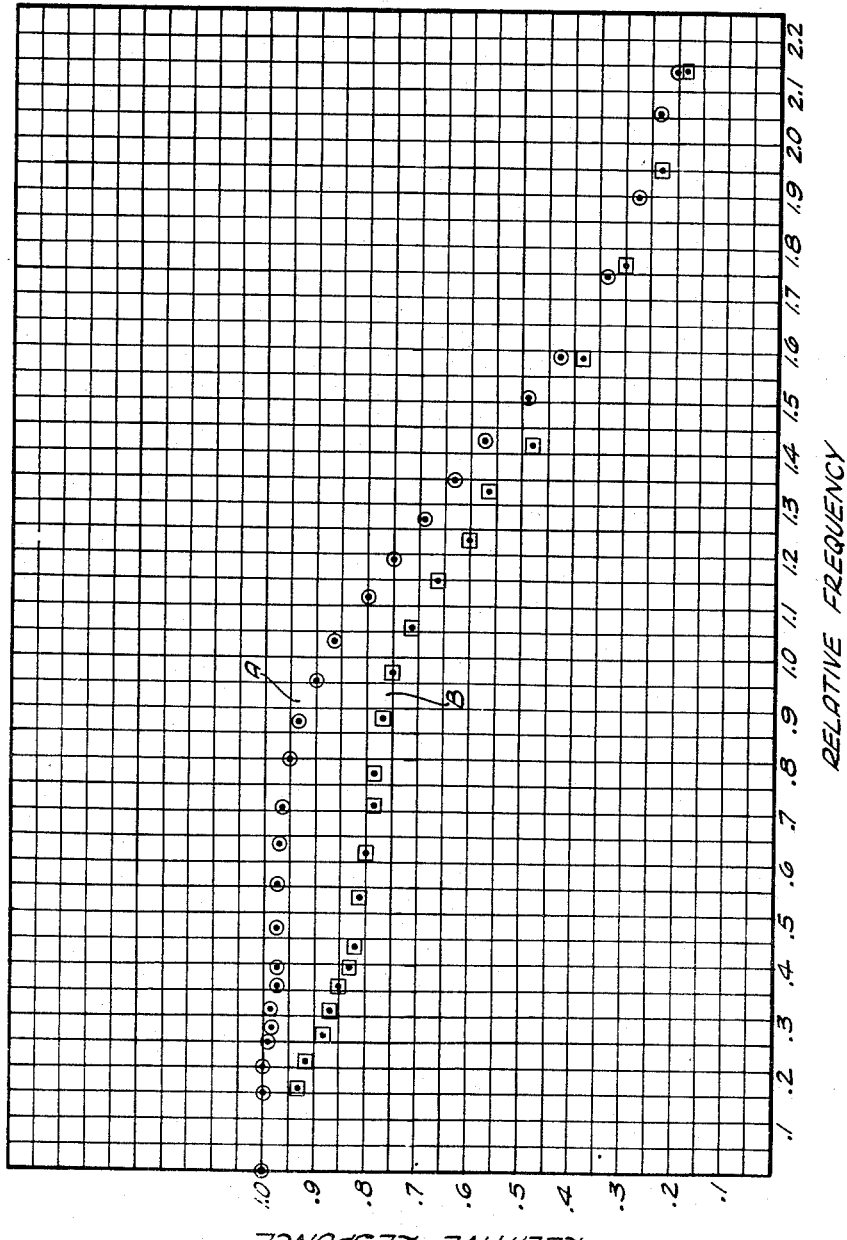
Fig. 6 is a chart showing the improved characteristics of the structure of Fig. 4.

The effect of the baffles as shown in Figs. 1 to 3 is illustrated by Fig. 6 in which curve A shows the respone characteristics of instrument #1 and curve B that of instrument #2. On the ordinate is plotted the relative response, i.e., the angular displacement of the paddle at various frequencies under constant angular acceleration of the case to the angular displacement of the paddle at zero frequency (obtained by extrapolating to zero frequency the measured outputs of the instrument at various frequencies under the same acceleration). The abscissa are the relative frequencies, i.e., the ratio applied frequency (at which the above response is obtained) to the natural frequency (i.e., the frequency at the 90° phase shift point).

It will be observed that curve B of instrument #2 shows bad droop characteristics. This droop has been removed by the introduction of the baffles. The response curve is substantially flat to a frequency of about 0.7 of the natural frequency.

While, as I have described above, I prefer to make the device symmetrical by providing like baffles, preferably horizontally disposed, in each subchamber, I may for some purposes omit the baffles in one subchamber or use unequally spaced or unequally numbered baffles in the subchambers, and may dispose them at any convenient angle in the subchambers with their surfaces at any convenient inclination to the top and bottom of the case. Instead of employing electromagnetic transducers to sense the angular displacement of said paddle, I may use any other convenient sensing mechanism, and thus I may use the unbounded strain wire gages as employed in the structures of the above Statham patents.

While I have described a particular embodiment of my invention for the purpose of illustration, it should be understood that various modifications and adaptations thereof may be made within the spirit of the invention as set forth in the appended claims.

I claim:

1. A motion sensing device, comprising a case, a liquid in said case, a paddle in said case immersed in said liquid, a mounting for said paddle for relative motion of said paddle with respect to the case, a yieldable constraint connecting said paddle to said case, a baffle extending along said paddle and spaced therefrom, dividing said case into a plurality of subchambers, the space between the paddle and said baffle forming a liquid communicating passageway from one subchamber to the other subchamber, and additional baffles in at least one of said subchambers, said additional baffles forming with said subchamber a plurality of elongated passageways in said subchamber between said last named baffles, and means for sensing the angular displacement of said paddle with respect to said case.

2. In the device of claim 1, in which said additional baffles are disposed in another of said subchambers, said baffles providing with said case a plurality of elongated parallel liquid passageways in said second subchamber.

3. A motion sensing device, comprising a case, a liquid in said case, a paddle in said case immersed in said liquid, a mounting for said paddle for relative motion of said paddle with respect to the case, the direction of said movement in a plane, said paddle extending across said chamber to but out of contact with the wall of said chamber, a yieldable constraint connecting said paddle to said case, a baffle extending along said paddle and spaced therefrom, dividing said case into a plurality of subchambers, the space between the paddle and said baffle forming a liquid communicating passageway from one subchamber to the other subchamber, and a plate in at least one of said subchambers positioned parallel to said plane, said plate forming with said case a plurality of parallel passageways in said subchamber, and means for sensing the angular displacement of said paddle with respect to said case.

4. In the device of claim 3, a horizontally positioned plate in another of said subchambers, said last named plate providing with said case a plurality of parallel liquid passageways in said second subchamber.

5. A motion sensing device comprising a case, a liquid in said case, a paddle in said case, a hinge mounting for said paddle, said paddle being angularly displaceable about said hinge, a yieldable constraint for said paddle on said hinge mounting, a baffle extending along said paddle and spaced therefrom, dividing said case into a plurality of subchambers, the space between the paddle and said baffle forming a liquid communicating passageway from one subchamber to the other subchamber, and a plurality of plates in said subchamber, said plates being positioned perpendicular to the axis of said hinge, said plates forming with said case a plurality of parallel passageways in said subchamber, and means for sensing the angular displacement of said paddle with respect to said case.

6. In the device of claim 5, a plurality of horizontally positioned plates in another of said subchambers, said last named plates providing with said case a plurality of parallel liquid passageways in said second subchamber.

7. A motion sensing device comprising a case, a liquid in said case, a paddle in said case, a hinge mounting for said paddle, said paddle being angularly displaceable about said hinge, a yieldable constraint for said paddle on said hinge mounting, said paddle extending across said chamber to but out of contact with the wall of said chamber, a baffle extending along said paddle and spaced therefrom, dividing said case into a plurality of subchambers, the space between the paddle and said chamber and said baffle forming a liquid communicating passageway from one subchamber to the other subchamber, a plurality of baffles in one of said subchambers, said baffles forming with said case a plurality of parallel passageways in said subchamber, said passageways being positioned to provide planes of circulation for said liquid in said passageways which are perpendicular to the axis of said hinge and means for sensing the angular displacement of said paddle with respect to said case.

8. In the device of claim 7, a horizontally positioned baffle in another of said subchambers, said baffle providing with said case a plurality of parallel liquid passageways in said second subchamber.

References Cited in the file of this patent

UNITED STATES PATENTS

| | | |
|---|---|---|
| 2,514,137 | O'Connor | July 4, 1950 |
| 2,768,798 | Johnston et al. | Oct. 30, 1956 |
| 2,778,623 | Statham | Jan. 22, 1957 |